United States Patent [19]

Watvedt

[11] Patent Number: 4,646,849

[45] Date of Patent: Mar. 3, 1987

[54] REVERSIBLE PLOUGH HAVING A REVERSING AND ADJUSTMENT MECHANISM

[75] Inventor: Jorn Watvedt, Kvernaland, Norway

[73] Assignee: Kverneland A/S, Kvernaland, Norway

[21] Appl. No.: 687,762

[22] Filed: Dec. 31, 1984

[30] Foreign Application Priority Data

Jan. 18, 1984 [NO] Norway ................... 840171

[51] Int. Cl.⁴ .......................... A01B 3/42; F01B 31/00
[52] U.S. Cl. ..................... 172/225; 172/647;
91/420; 91/516; 91/517; 92/13.1; 92/110; 92/174
[58] Field of Search ............... 172/212, 224, 225, 647, 172/283; 91/517, 516, 420; 92/110, 174, 13.1

[56] References Cited

U.S. PATENT DOCUMENTS

| | | | |
|---|---|---|---|
| 2,258,886 | 10/1941 | Ernst | 60/394 |
| 2,478,790 | 8/1949 | Stephens | 91/167 R |
| 2,596,471 | 5/1952 | Densmore et al. | 91/167 R |
| 2,669,972 | 2/1954 | Cross | 92/12 |
| 3,168,013 | 2/1965 | Williamson | 92/174 X |
| 3,168,853 | 2/1965 | Prince | 91/167 R |
| 3,627,058 | 12/1971 | Johannsen | 172/225 X |
| 3,730,279 | 5/1973 | Dowdeswell | 172/212 |
| 3,744,573 | 7/1973 | Mellen | 172/225 |
| 3,869,861 | 3/1975 | Case | 280/708 X |
| 3,871,266 | 3/1975 | Schwab et al. | 91/517 |
| 3,934,653 | 1/1976 | Becker | 172/212 |
| 4,046,623 | 9/1977 | Schmid | 162/306 |
| 4,206,689 | 6/1980 | Peterson | 91/517 X |
| 4,230,024 | 10/1980 | Becker | 92/110 X |
| 4,311,083 | 1/1982 | Guillon | 91/445 X |
| 4,341,148 | 7/1982 | Kosarzecki | 172/225 X |
| 4,415,040 | 11/1983 | Salva | 172/647 X |
| 4,526,237 | 7/1985 | Skjaeveland | 172/647 |

FOREIGN PATENT DOCUMENTS

| | | | |
|---|---|---|---|
| 2436853 | 2/1976 | Fed. Rep. of Germany | 172/430 |
| 2509454 | 4/1976 | Fed. Rep. of Germany | 172/212 |
| 2658393 | 6/1978 | Fed. Rep. of Germany | 92/13.1 |
| 2902554 | 12/1979 | Fed. Rep. of Germany | 172/212 |
| 3015630 | 10/1981 | Fed. Rep. of Germany | 172/212 |
| 2329174 | 7/1977 | France | 172/212 |
| 861777 | 9/1931 | U.S.S.R. | 92/13.1 |

Primary Examiner—Richard T. Stouffer
Assistant Examiner—Terrence L. B. Brown
Attorney, Agent, or Firm—Schwartz, Jeffery, Schwaab, Mack, Blumenthal & Evans

[57] ABSTRACT

A reversing and adjustment mechanism, especially for a reversible plough adapted for hydraulically adjustable furrow width and hydraulic reversing of the plough, wherein the reversing and adjustment mechanism comprises a hydraulic cylinder (8) with a "hydraulic memory" for adjustment of the furrow width. The oil chambers on both sides of the ordinary piston (15) in the adjustment cylinder (8) communicate with a reservoir (24) via two pilot-controlled check valves (26, 25) with open passage toward the adjustment cylinder (8) and a second direction-control valve (10). The chamber (31) in the adjustment cylinder (8) between the rear head and a freely movable piston (17) communicates on the one hand with a hydraulic cylinder (7) for reversing the plough, preferably with the rod end thereof, via a first check valve (14) with open passage toward the reversing cylinder (7), and on the other hand communicates with the reservoir (24) via a flow-control valve (28) and a first direction-control valve (9). The reversing cylinder (7), on the end opposite its rod; i.e., preferably on the piston end, communicates on the one hand with the rod end of the adjustment cylinder (8) via a pilot-controlled check valve (36) with open passage toward the reversing cylinder (7) and a pilot-controlled check valve (32) with open passage toward the adjustment cylinder (8), and on other hand communicates with the reservoir (24) via a pilot-controlled check valve (36), the reversible flow-control valve (28) and a first direction-control valve (9).

3 Claims, 3 Drawing Figures

REVERSIBLE PLOUGH HAVING A REVERSING AND ADJUSTMENT MECHANISM

This application claims subject matter which is disclosed in prior co-pending application Ser. No. 06/676,246 now abandoned.

BACKGROUND OF THE INVENTION

1. Field of the Invention

The present invention relates to a reversing and adjustment mechanism, especially for use on a reversible plough with hydraulically controlled, adjustable furrow width and hydraulically controlled reversal of the plough. Such ploughs normally have from two to five pairs of ploughshare bodies rotatably attached to a frame which at the front end thereof is rotatably suspended from a reversing head adapted to be mounted on a tractor's three-point suspension. At the rear end of the frame, the reversible plough is provided with a depth wheel.

2. Background Art

Several drawbacks of the prior art reversible ploughs are associated with the reversing mechanism which pivots the plough frame 180° for changing the direction of ploughing from the right to the left side of the tractor, or vice-versa. On the prior art reversible ploughs, the hydraulic system for the reversing mechanism and the hydraulic system for adjusting the furrow width are two separate systems. As a result, the plough is usually reversed with the ploughshares set at the furrow width one has been using. When the plough is set for a broad furrow width, great force is required for reversing the plough, since the plough's center of gravity lies far outside the axis of rotation. In addition, the plough's center of gravity is raised during the reversing operation, which makes the tractor less stable and increases the risk of overturning.

Of course, it is possible to activate the hydraulic system separately, adjusting the plough to the minimum furrow width before reversing the plough. In that case, the hydraulic system for controlling the furrow width must first be activated for pivoting the plough frame to the minimum width, then the hydraulic system for reversing the plough must be activated; and after the plough has been reversed, the hydraulic system for adjusting the furrow width must again be activated for returning the plough frame to the position it had prior to the reversal. This procedure for reversing the plough is obviously cumbersome; moreover, it is often difficult to adjust the plough to exactly the same furrow width as it had prior to the reversing operation.

OBJECTS AND SUMMARY OF THE INVENTION

The object of the present invention is to provide a combined reversing and adjustment mechanism, especially for reversible ploughs with adjustable furrow width, which eliminates the above drawbacks. The object is obtained with a reversing and adjustment mechanism comprising a reversing and adjustment mechanism, especially for a reversible plough adapted for hydraulically adjustable furrow width and hydraulic reversing of the plough, wherein the reversing and adjustment mechanism comprises a hydraulic cylinder with a "hydaulic memory" for adjustment of the furrow width. The oil chambers on both sides of an ordinary piston in the adjustment cylinder communicate with a reservoir via two pilot-controlled check valves with open passages toward the adjustment cylinder and a second direction-control valve. The chamber in the adjustment cylinder between the rear head and a freely movable piston communicates on the one hand with a hydraulic cylinder for reversing the plough, preferably with the rod end thereof, via a first check valve with open passage toward the reversing cylinder, and on the other hand communicates with the reservoir via a flow-control valve and a first direction-control valve. The reversing cylinder, on the end opposite its rod, i.e., preferably on the piston end, communicates on the one hand with the rod end of the adjustment cylinder via a pilot-controlled check valve with open passage toward the reversing cylinder and a pilot-controlled check valve with open passage toward the adjustment cylinder, and on the other hand communicates with the reservoir via pilot-controlled check valve, the reversible flow-control valve and a first direction-control valve.

BRIEF DESCRIPTION OF THE DRAWINGS

An exemplary embodiment of the invention is shown in the accompanying drawings, wherein.

DETAILED DESCRIPTION OF THE INVENTION

Figure 1:
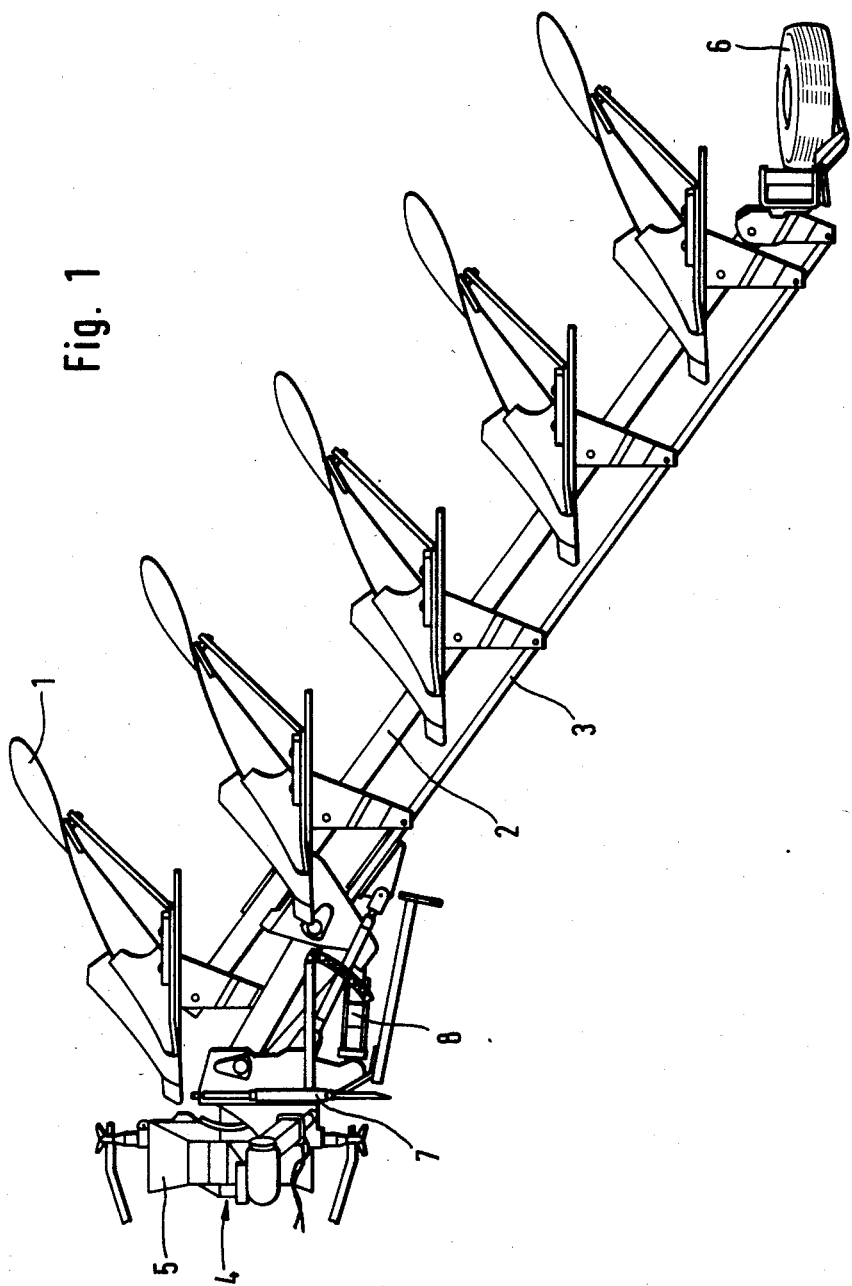
FIG. 1 shows a reversible plough with adjustable furrow width seen from above, with the reversing and adjustment mechanism of the invention mounted thereon, wherein the plough is set for a wide furrow spacing.
Figure 2:
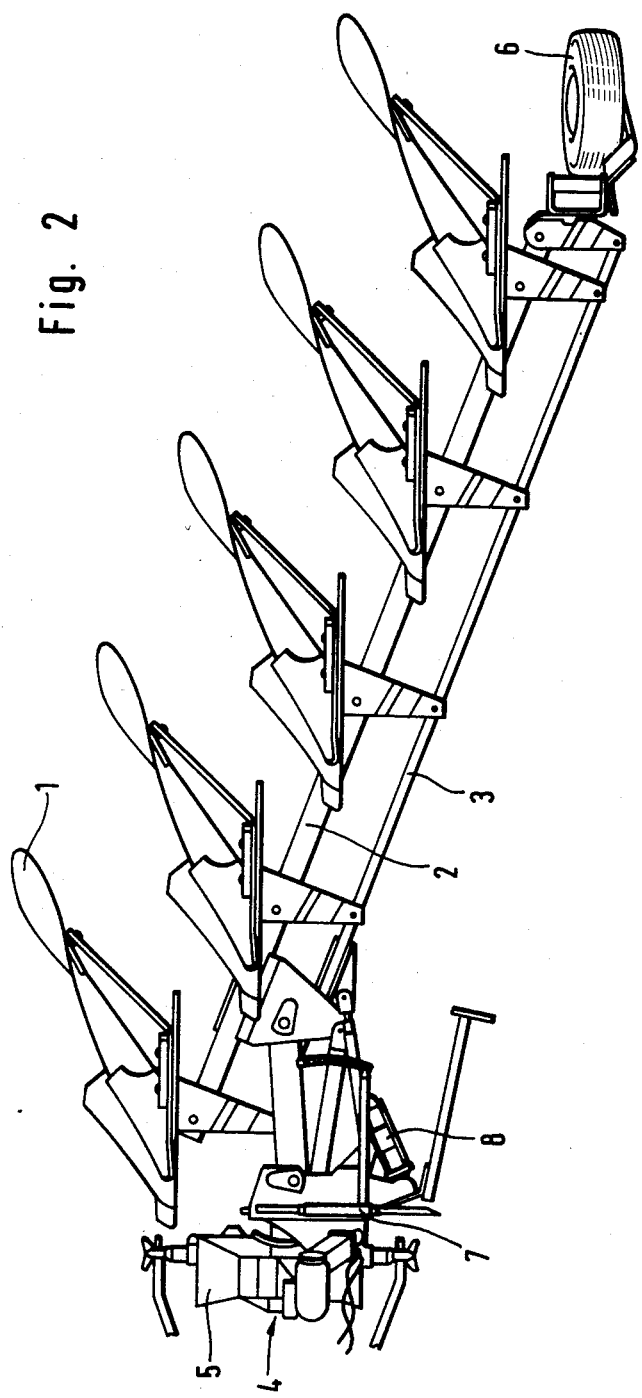
FIG. 2 shows the same plough as FIG. 1, but wherein the plough is set for minimum furrow spacing.

In the illustrated example, the reversible plough has five double ploughshare bodies 1. For the sake of simplicity, the downwardly-facing ploughshares are not shown in the drawing. The ploughshares 1 are rotatably fastened in pairs to a plough frame 2 and a parallel bar 3, and the front end of the frame 2 is provided with a shaft 4 which is rotatably mounted on a reversing head 5. The reversing head 5 is adapted to be suspended from a tractor's three-point suspension, so that the shaft 4 is in alignment with the centerline of the tractor. The rear end of the frame 2 is provided with a depth control wheel 6 which, as known per se, is adapted to assume the correct position whether the plough is set for right-handed or left-handed ploughing. By means of a hydraulic reversing cylinder 7, the plough can be pivoted approximately 180° about the shaft 4, so that it can plough on either the left or the right side of the tractor. This is done by first adjusting the plough to its minimum furrow width, as seen in FIG. 2, by means of a hydraulic adjustment cylinder 8, whereupon the reversing cylinder 7 is activated, which first obtains pressure on the rod end, and when it has pivoted the plough about 90° and the piston is all the way in, the oil flow is caused to reverse, so that the cylinder 7 obtains pressure on the piston end during the remaining pivot action of the plough about its shaft 4 until it has been pivoted about 180°.

The hydraulic systems for adjusting the furrow width and for reversing the plough, in accordance with the invention, are both coupled to a special mechanism, so that when the mechanism by a simple hand manipulation of a first direction-control valve 9 on the tractor is activated for reversing the plough, the following operations automatically occur: First, the plough is pivoted in from the set furrow spacing to the minimum width, then the plough is reversed, pivoting about 180°, and finally the plough is pivoted back to the original furrow width setting. After reversal, if desired, the furrow spacing can be reset with continuously variable adjustment to a different furrow width by means of a second direction-control valve 10 on the tractor, without initiating the reversing operation itself.

Figure 3:
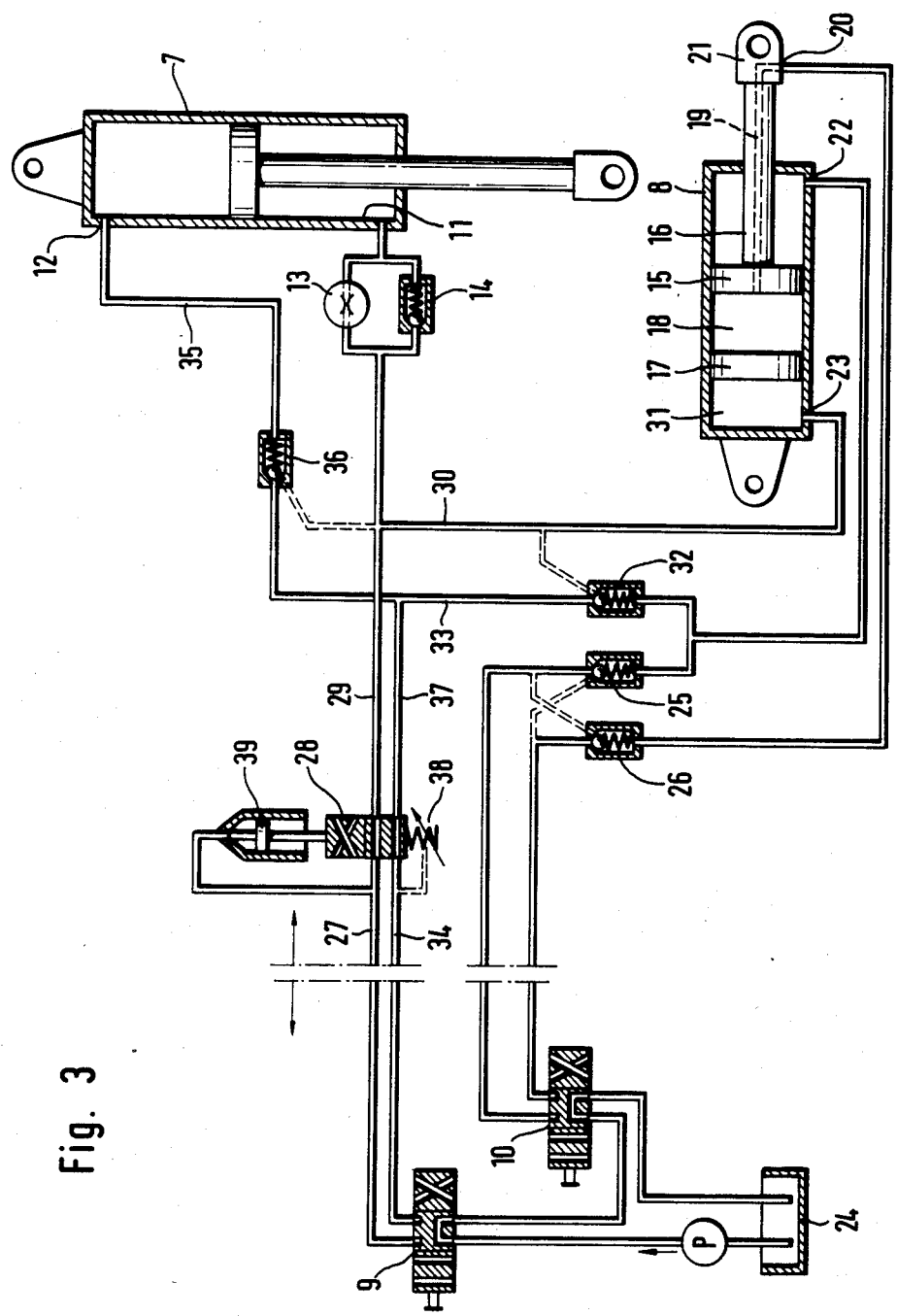
FIG. 3 shows a hydraulic circuit diagram for the reversing and adjustment mechanism of the invention.

An exemplary embodiment of the mechanism of the invention will be described below with reference to FIG. 3, which shows the reversing hydraulic cylinder 7 with ports 11 and 12 at the front and rear heads of the cylinder, a choke valve 13 in the front head of the cylinder 7, and a first check valve 14 connected in parallel with the choke valve 13 and open toward the reversing cylinder 7. There is also a second hydraulic cylinder 8 for continuously variable adjustment of the plough's furrow width. The adjustment cylinder 8 is a new type having a so-called "hydraulic memory". As seen in FIG. 3, the adjustment cylinder 8 has, in addition to an ordinary piston 15 and associated rod 16, an unfixed and freely movable piston 17, so that a variable chamber 18 is formed between the pistons 15 and 17. The chamber 18 can be brought to communicate with the tractor's hydraulic system via an axial bore 19 in the piston rod 16 and a port 20 in the clevis 21 of the piston rod 16. In addition, the front and rear heads of the adjustment cylinder 8 are provided in the conventional manner with ports 22 and 23 respectively.

By means of the second direction-control valve 10 on the tractor, the hydraulic cylinder 8 for continuously variable adjustment of the furrow width can be activated, so that when the plough is to be set for a broader width, oil flows from the tractor's reservoir 24 via the second direction-control valve 10, a second pilot-controlled check valve 25 with open passage toward the adjustment cylinder 8, and the port 22, to the rod end of the adjustment cylinder 8, while at the same time return oil flows from the chamber 18 between the pistons 15 and 17 in the adjustment cylinder 8 via the bore 19 in the piston rod 16, port 20, a third pilot-controlled check valve 26 with open passage toward the adjustment cylinder 8, and the second direction-control valve 10 to the reservoir.

When the plough is to be adjusted for smaller furrow width, the hydraulic adjustment cylinder 8 is activated by means of the second direction-control valve 10, so that oil flows from the tractor's reservoir 24 via second direction-control valve 10, third pilot-controlled check valve 26, port 20 in the clevis 21 of the piston rod 16 and bore 19 in the piston rod 16 to the variable chamber 18 between the pistons 15 and 17 of the adjustment cylinder 8, while at the same time return oil flows from the rod end of the adjustment cylinder 8 via port 22, second pilot-controlled check valve 25 and second direction-controlled valve 10 to the tractor's reservoir 24.

When the plough is to be reversed, the entire reversing process occurs automatically once the first direction-control valve 9 on the tractor is operationally connected. This causes oil to flow from the tractor's reservoir 24 via a flow line 27, a reversible flow-control valve 28, a flow line 29, the first check valve 14 and the port 11 to the rod end of the reversing cylinder 7, and also through a flow line 30 and port 23 to a chamber 31 between the rear head of the adjustment cylinder 8 and the freely movable piston 17. Since the adjustment cylinder 8 has less mass to move than the reversing cylinder 7, the adjustment cylinder 8 will begin to move first; i.e., the flow of oil into the chamber 31 presses the movable piston 17 and thereby the "oil plug" in the chamber 18 and the piston 15 outwardly in the adjustment cylinder 8. The return oil will flow out through the port 22 to a fourth pilot-controlled check valve 32 with open passage toward the adjustment cylinder 8, and the aforementioned second pilot-controlled check valve 25. The latter check valve 25, however, will be closed, since no oil is passing through the second direction-control valve 10; but the oil will pass through the fourth pilot-controlled check valve 32 which is opened by the oil pressure in the flow line 30, and flow further through a flow line 33, the reversible flow-control valve 28, a flow line 34 and the first direction-control valve 9 to the reservoir 24. When the adjustment cylinder 8 has reached its full stroke length and the plough is thus set for its minimum furrow width, the oil pressure in the chambers 31 and 18 in the adjustment cylinder 8 will rise. The piston 17, as explained earlier, is detached and freely movable. As a result, the oil pressure in the port 20 and the third pilot-controlled check valve 26 will rise, but this check valve is closed since the second direction-control valve 10 is in a closed position, such that the third pilot-controlled check valve 26 does not obtain pilot pressure to open. This means that the volume of oil in the chamber 18 within the adjustment cylinder 8 remains constant. The oil pressure from the first direction-control valve 9, however, still affects the piston in the reversing cylinder 7 through the port 11 and will now move the piston inwardly within the cylinder 7. The return oil will flow out through the port 12, flowing via a flow line 35 to a fifth pilot-controlled check valve 36 with open passage toward the reversing cylinder 7, and which is open because there is pressure in the flow line 29. The return oil will flow further from the fifth pilot-controlled check valve 36 through a flow line 37, the reversible flow-control valve 28, flow line 34 and first direction-control valve 9 to the tractor's reservoir 24. When the piston in the reversing cylinder 7 has extended inwardly its full stroke length—the plough is then pivoted about 90°—the oil pressure in the port 11 and flow lines 29 and 27 will rise. This oil pressure affects a spring-loaded 38 piston 39 in the reversible flow-control valve 28, and when the force on the piston 39 exceeds the spring force 38, the flow-control valve 28 will alter the connection of the flow lines, so that the flow line 37 will communicate with the flow line 27 which is under pressure, and the flow line 29 will communicate with the flow line 34. Therefore, the reversing cylinder 7 will obtain pressure on its piston end via the port 12, which pushes the piston outwardly in the cylinder 7. The return oil will flow out through the port 11 and be choked by the choke valve 13. The return oil will travel further through the flow line 29, flow-control valve 28, flow line 34 and first direction-control valve 9 to the tractor's reservoir 24.

The oil pressure in the flow line 37, however, also affects the flow line 33, and oil will pass the fourth pilot-controlled check valve 32 and the port 22 on the rod end of the adjustment cylinder 8, pushing the piston 15 inwardly in the adjustment cylinder 8. The oil in the chamber 18 within the adjustment cylinder 8, via the port 20, will then exert pressure against the third pilot-controlled check valve 26, but this valve remains closed since the second direction-control valve 10 is closed, and the volume of oil in the chamber 18 will remain constant. However, the oil in the chamber 31 in the adjustment cylinder 8 will flow out through the port 23 and travel via the flow lines 30 and 29, the flow-control valve 28, flow line 34 and first direction-control valve 9 to the tractor's reservoir 24 until the detached, freely movable piston 17 has moved all the way to the end of the adjustment cylinder 8. The reversing cylinder 7 has then extended its piston completely, the entire reversing process has been completed, and both the reversing cylinder 7 and the adjustment cylinder 8 are in the same position as when the reversing process was initiated.

Varying lateral forces on the plough will cause corresponding variable pressure in the ports 20 or 22 of the adjustment cylinder 8, but as long as the first and second direction-control valves 9 and 10 are not operated, the pressure will stop at the pilot-controlled check valves 26 or 25 and 32.

I claim:

1. A reversible plough having a plurality of ploughshare bodies rotatably mounted to a frame and a substantially parallel bar, a reversing head adapted to be suspended from a tractor, the frame having a front end rotatably mounted to the reversing head, a reversing and adjusting hydraulic mechanism for said plough comprising:
   means for reversing the plough about the rotatable mount of said front end including a hydraulic reversing cylinder,
   means for first pivoting the plough inwardly from a set furrow width and then pivoting the plough back to said set furrow width, and including means for continuously variably adjusting the furrow width without initiating the reversing means, said pivoting means comprising:
   a hydraulic adjustment cylinder having a plurality of oil chambers therein formed by an end wall, a freely movable piston, a piston connected to a rod, and another end wall through which the rod extends,
   two of said oil chambers communicating with a reservoir via a pair of pilot-controlled check valves and a direction control valve,
   another of said oil chambers communicating with said hydraulic reversing cylinder via a further check valve and also communicating with another direction control valve.

2. The mechanism of claim 1, including said reversing cylinder further communicating with the adjustment cylinder via at least one other pilot-controlled check valve and also communicating with said another direction-control valve.

3. A reversible plough having a plurality of ploughshare bodies rotatably mounted to a frame and a substantially parallel bar, a reversing head adapted to be suspended from a tractor, the frame having a front end rotatably mounted to the reversing head, a reversing and adjusting hydraulic mechanism for said plough comprising:
   means for reversing the plough about the rotatable mount of said front end including a hydraulic reversing cylinder,
   means for first pivoting the plough inwardly from a set furrow width and then pivoting the plough back to said set furrow width, and including means for continuously variably adjusting the furrow width without initiating the reversing means, said pivoting means comprising:
   a hydraulic adjustment cylinder having a plurality of oil chambers therein formed by an end wall, a freely movable piston, a piston connected to a rod, and another end wall through which the rod extends,
   a pair of pilot-controlled check valves connected to two of said oil chambers in the adjustment cylinder and a direction-control valve communicating with a hydraulic oil reservoir, said hydraulic reversing cylinder connected to another of said oil chambers, said reversing cylinder also communicating with one of said oil chambers of the adjustment cylinder through a pair of pilot-controlled check valves, said reversing cylinder also communicating with a reversible flow-control valve and another direction-control valve.

* * * * *